United States Patent Office 3,242,371
Patented Mar. 22, 1966

3,242,371
HOLLOW-CATHODE DISCHARGE LAMP FOR EMISSION OF ATOMIC RESONANCE LINES
Masao Sugawara, Daito-ku, Tokyo-to, Hiroshi Okagaki, Kodaira-shi, and Yasushi Ikuta, Kitatama-gun, Tokyo-to, Japan, assignors to Kabushiki Kaisha Hitachi Seisakusho, Tokyo-to, Japan, a joint-stock company of Japan
Filed Mar. 27, 1963, Ser. No. 268,292
Claims priority, application Japan, Mar. 29, 1962, 37/11,532
4 Claims. (Cl. 313—205)

This invention relates to atomic absorption spectrophotometry, and more particularly it relates to a new hollow-cathode discharge lamp for generating atomic resonance lines for use in atomic absorption spectrophotometers.

In general, the atomic resonance line absorption measurement method comprises introducing a sample solution in the form of a mist into a suitable flame to cause the sample solution to evaporate and thereby to create, beforehand, a sample vapor within said flame, passing a light separately from a suitable, high-temperature light source through this flame, measuring the degree of absorption at exactly the wavelength of the resonance line of the element to be analyzed, and determining the concentration of the element within the unknown sample by utilizing the fact that this measured absorption has a definite relationship to the concentration of the element within the sample. For this purpose, by preparing, beforehand, a number of standard samples of known concentrations of the element to be analyzed, measuring the aforesaid absorption for each of these standard samples, and determining an analytical curve indicating the relationship between the sample concentration and absorption it is possible to carry out analysis of an unknown sample. The conventional apparatus used heretofore for accomplishing the above-described operation have been accompanied by difficulties and disadvantages as will be described in greater detail hereinafter.

It is a prime object of the present invention to provide a new hollow-cathode discharge lamp in which the difficulties associated with a conventional atomic absorption spectrophotometry are eliminated.

The precise nature, principle, and details of the invention, as well as other objects and advantages thereof, will be best understood by reference to the following description, taken in conjunction with the accompanying drawing in which.

Figure 1:
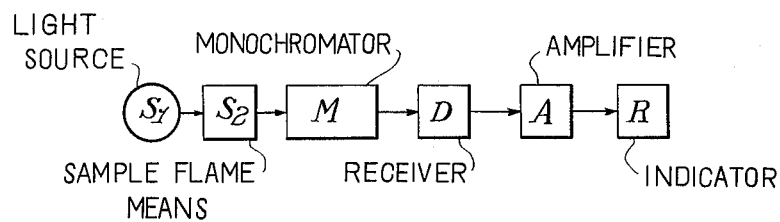
FIGURE 1 is a block diagram of an atomic absorption spectrophotometer of general arrangement.

Referring to FIGURE 1, in a general type, atomic absorption spectrophotometer suitable for practicing the afore-mentioned atomic resonance line absorption measurement method, light from a light source $S_1$ radiating the spectral lines of the element to be analyzed is passed through a flame means $S_2$ and introduced into a monochromator M. By adjusting this monochromator M to the wavelength $\lambda$ of the spectral line the absorption of which is to be observed, a light of a certain wavelength width $\Delta\lambda$ in the neighborhood of the wavelength $\lambda$ can be obtained through the exit slit of the monochromator M. This light is received by a receiver D and passed through an amplifier A, and the intensity of this light is caused to be indicated by an indicator R. It is contemplated, thus, to measure the degree of absorption through the indication degree of the indicator R in the cases when a sample is introduced and when no sample is introduced into the aforesaid flame means $S_2$.

In a conventional apparatus of this type, a hollow-cathode discharge lamp has been used as the aforesaid light source in order to increase the analytical sensitivity.

Figure 3:
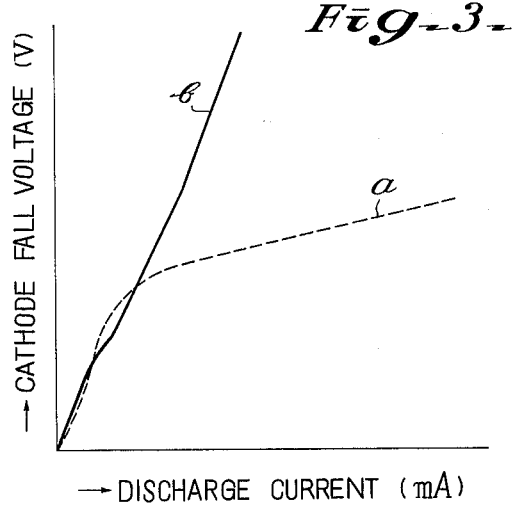
FIGURE 3 is a graphical representation showing the cathode fall voltage versus discharge current characteristic curves for the electrode outer surface and inner surface of an ordinary hollow cathode.

As is well known, an atomic resonance line generating mechanism depending on sputtering and evaporation of a hollow cathode of hollow cylindrical form in the region of abnormal glow discharge is utilized in a hollow-cathode discharge lamp. In general, in such a hollow-cathode discharge lamp, the abnormal glow discharge from the inner wall surface of the hollow cathode is referred to as a hollow-cathode discharge, and the discharge from the outer wall surface of the hollow cathode exhibits ordinary discharge characteristics. The respective characteristics, that is, the relationships between the cathode fall voltages and discharge currents are as indicated by curves $a$ and $b$ in FIGURE 3. It will be observed that, at and above a certain value of the cathode fall voltage, the cathode fall voltage of the cathode outer wall surface discharge is higher than that of the hollow cathode inner wall surface discharge (hollow-cathode discharge), and the discharge current is proportionally divided and flows into the inner wall and outer wall as shown.

Since this ratio of proportional division differs with the cathode diameter, the kind of sealed-in gas, the sealed-in gas pressure, the electrode material, and the operation fall voltage, and since an atomic resonance line generating mechanism depending on the sputtering and evaporation in the discharge of a hollow-cathode inner wall surface is utilized in the hollow-cathode discharge lamp, the aforesaid ratio of proportional division of the discharge current also varies. Accordingly, such an apparatus has the disadvantage of variation of the intensity of the atomic resonance line and worsening of the analytical sensitivity of the aforesaid atomic resonance line absorption spectrophotometer.

The present invention, which contemplates the removal of such disadvantages, will now be described in detail hereinbelow with respect to a preferred embodiment thereof.

Figure 2:
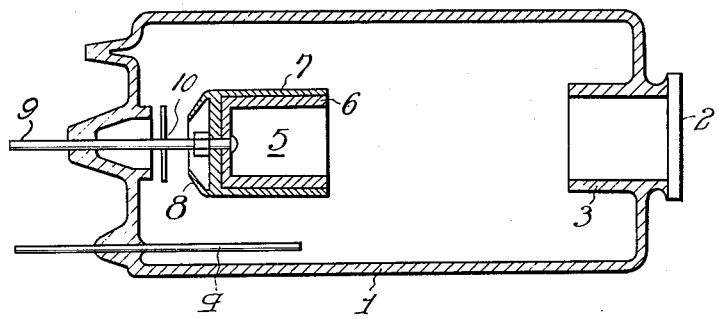
FIGURE 2 is an elevational view, in vertical section, showing a preferred embodiment of the invention.

Referring to FIGURE 2, the said embodiment of the discharge lamp shown therein has an outer structure consisting of a lamp bulb 1 made of a material such as glass and an extraction window 2 made of a material such as quartz glass for extraction of atomic resonance lines, the said window 2 being supported by a supporting cylinder 3. A lead wire 4 forms a discharge anode at an off-center position. A hollow-cathode assembly 5, which embodies the substance matter of the present invention, is disposed axially within the bulb 1 at the end opposite to the window 2 and consists of a hollow cathode 6 of hollow cylindrical shape (cup shape) made of a metal and adapted to emit desired atomic resonance lines and a protective vessel 7 which is fitted tightly about the outer surface of the cathode 6 except for the open end thereof and is made of a heat-resistant, electrically insulating material such as quartz or ceramics, and which has a conical fin 8 about the periphery of its closed end. The hollow cathode 6 is provided with an axially disposed lead wire 9 connected to the center of the closed end thereof. An insulating ring 10 made of a substance such as mica is provided axially on the inner wall of the lamp bulb 1 in the region thereof approached by the lead wire 9. The ring 10 functions to prevent shorting between the anode and cathode due to sputtering of the electrode materials accompanying discharge. In addition, the aforesaid conical fin 8 of the vessel 7 functions to prevent shorting, due to causes such as sputtering of the electrodes, of the hollow cathode 6 and lead wire 9 through the outer surface of the vessel 7. A gas such as argon is sealed in within the lamp bulb 1 at a pressure of the order of a number of millimetres Hg.

Since, by the above-described construction of the hollow cathode discharge lamp of the present invention wherein the outer surface of the hollow cathode 6, except for its open end, is closely enclosed by the protective vessel 7, discharge does not occur from its outer wall surface (discharge of curve b in FIGURE 3) when a voltage is impressed across the anode 4 and cathode 6 to cause discharge, and only discharge from the inner wall surface of the hollow cathode 6, that is, a glow discharge (that of curve a in FIGURE 3), occurs. Accordingly, the resonance line so emitted is highly stable.

As will be observed from the foregoing description, the present invention provides a hollow-cathode discharge lamp capable of emitting highly stable atomic resonance lines. Accordingly, the sensitivity of an atomic absorption spectrophotometer can be substantially increased through the use therein of this hollow-cathode discharge lamp.

Although this invention has been described with respect to a particular embodiment thereof, it is not to be so limited as changes and modifications can be made therein which are within the full intended scope of the invention, as defined by the appended claims.

What is claimed is:

1. A hollow cathode discharge tube for emission of atomic resonance lines comprising a hollow cathode; a protective container of heat-resistant and electrically insulating quality, having an open and a closed end and a conical fin about the periphery of said closed end; said container tightly covering the outer periphery of said cathode; a supporting cylinder opposite the open end of said cathode and supporting an extraction window of atomic resonance lines, having a cylindrical part projecting into said tube; and an anode leading into said discharge tube.

2. A hollow cathode discharge tube for emission of atomic resonance lines comprising a substantially cylindrical bulb; a cylinder disposed in one end of said bulb; an extraction window disposed within said cylinder; a hollow cathode disposed in the opposite end of said bulb and axially arranged therein; a protective vessel fitted tightly about the outer periphery of said cathode, having an open and a closed end and provided with a conical fin about said closed end; and an anode disposed in parallel with said cathode.

3. A hollow cathode discharge tube for emission of atomic resonance lines comprising a substantially cylindrical bulb; a cylinder disposed in one end of said bulb; an extraction window disposed within said cylinder; a hollow cathode disposed in the opposite end of said bulb and axially and substantially concentrically arranged therein; a protective vessel of heat resistant and electrical insulating qualities fitted tightly about the outer periphery of said cathode, having an open end and a closed end and provided with a conical fin about said closed end; and an anode disposed in parallel with said cathode.

4. A hollow cathode discharge tube for emission of atomic resonance lines comprising a substantially cylindrical glass bulb; a cylinder disposed in one end of said bulb; a quartz extraction window disposed within said cylinder; a hollow cathode disposed in the opposite end of said bulb and axially and concentrically arranged therein; a protective vessel of heat resistant and electrical insulating quality fitted tightly about the outer end of said cathode, having an open and a closed end and provided with a conical fin about said closed end; a lead wire leading into said cathode; an insulating ring disposed between said cathode and said bulb concentrically about said lead wire; and an anode disposed in parallel with said cathode.

References Cited by the Examiner

UNITED STATES PATENTS 2,445,679  7/1948  Lemmers _____ 313—209 X
2,605,438  7/1952  Stutsman _____ 313—209 X GEORGE N. WESTBY, *Primary Examiner.*

D. E. SRAGOW, *Assistant Examiner.*